Nov. 7, 1961    L. DAVIDSON    3,007,570
SEED SOWING DISPENSER
Filed March 7, 1956
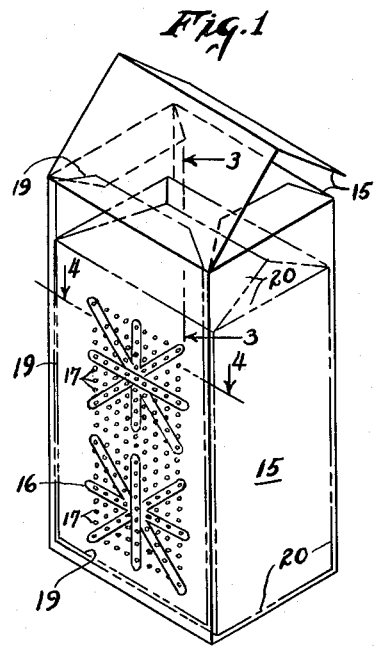
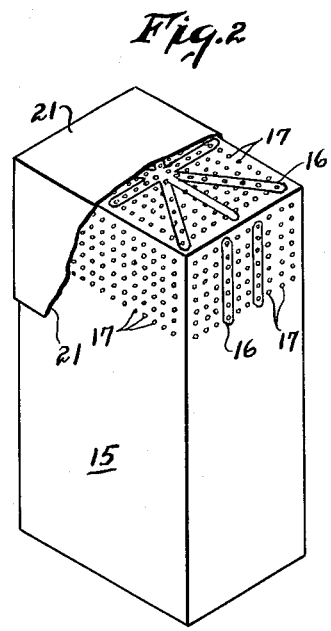
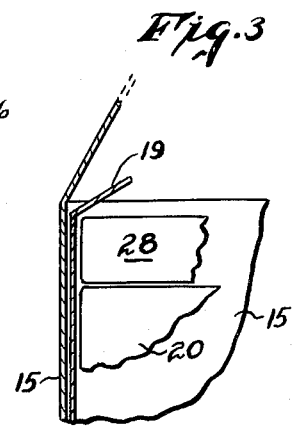
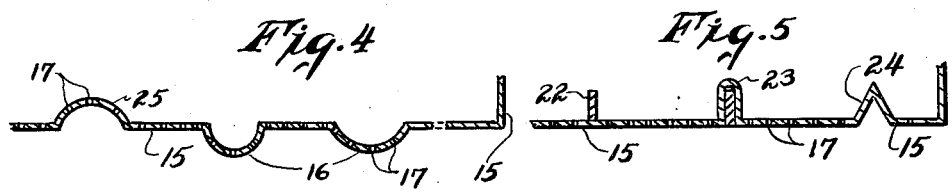
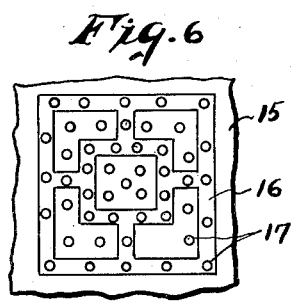
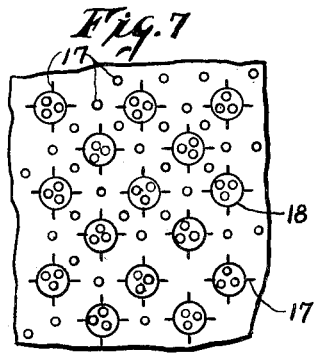
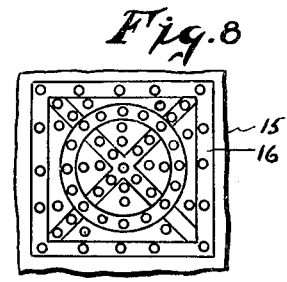
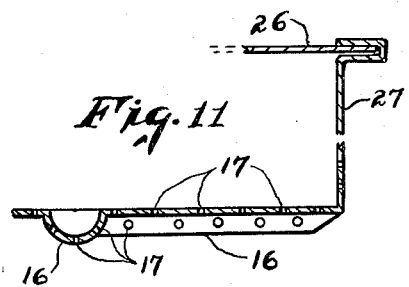
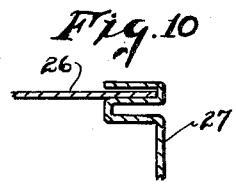
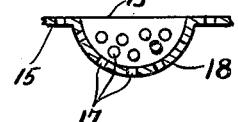
INVENTOR.
Louis Davidson
BY Emery, Whittemore, Sandoe & Dix
ATTORNEYS United States Patent Office 3,007,570
Patented Nov. 7, 1961

3,007,570
SEED SOWING DISPENSER
Louis Davidson, 24 Waterview Road, Oceanside, N.Y.
Filed Mar. 7, 1956, Ser. No. 570,073
8 Claims. (Cl. 206—56)

This invention relates to an improved device for sowing seeds, especially seeds of the expensive kind, such, for instance, as a special grass seed or other like type seeds. This novel device or article is also usable to dispense fertilizer, or the combination of seed and fertilizer, or to satisfactorily dispense other material.

Further, the improved invention pertains to a novel device, or dispenser, or spreader, which acts as a container for transporting one or more bags of seeds and thereafter when the seeds have been poured from the bags into the container to sow them in a uniform manner with practically no loss of the seed.

Heretofore with seed sowing devices, whether employed for sowing grass seed or other seed, and when the device is pushed around, it has been found that in making turns with the device, or stopping the device, or backing it up, small piles of the seed are found on the ground due to leakage of the seeds. The seeds in these piles become lost seed. The cost of obtaining satisfactory distribution in the sowing without loss of seed becomes very important, and it is of material advantage not to have such losses. It has been found that the sowing device herein is a most satisfactory improvement over the ordinary hand sowing, as uniformity of spreading is obtained, and the device is also very helpful as extra amounts of seed may be readily and easily placed on spots or plots that otherwise would have only one sprinkling if done by a machine.

This invention also pertains to a seed sower or spreader device usually of a portable nature, and one that is especially constructed so that there will be a substantially uniform flow of seeds from the sower, spreader, or container when shaken or agitated in a normal gentle manner.

The invention further pertains to a novel structure of container or sowing device having therein various bulging formations, or corrugations, or projections, or baffles, or their equivalents, so that the flow of seeds through the openings in the portable container or sower will be substantially uniform and operating in a manner to prevent waste of the seeds.

One of the main features of this invention is to provide a novel relatively small seed sowing device which will hold bagged seed for shipment and then will receive the seed freed from the bag, and sometimes mixed with fertilizer, and then sow the seed and the fertilizer, or the device may be used to sow the seed separately and the fertilizer separately.

Another feature of this invention is to provide a low cost container for holding a definite amount of seed without loss for purchase and for carrying home without spilling, and thereafter using the same container to act as a spreader or sower of the seed in substantially uniform flow from the container by slight agitation. These improved containers can be made of different sizes to hold 1, 2 or 5 pounds of seed, or to hold larger weights, if desired. Also, the containers may be refilled from other bags of seed.

The hand sowers or dispensers disclosed herein are of very low cost of manufacture and distribution as compared to the usual mechanical devices now on the market. In many instances, it is also economical and practical to use the low cost sower disclosed herein and dispose of it after all of the seed, or the seed and fertilizer, have been sown or dispensed.

Also, the improved type of sower or spreader disclosed and described herein, is capable of being produced in quantity, and if made of paper may be shipped in knockdown fashion, and is disposable. These spreaders are particularly useful in spreading seed alone or fertilizer alone, or for both, or for spreading any other material which requires uniform spreading. When the spreaders are made of plastics or metal, they are shipped in their usable form, and may be used many times over.

Another feature of the improved invention is to provide a novelty formed seed sowing container that is constructed in a novel fashion to control to a large extent the flow of seeds to any one or two or more or groups of adjacent perforations so that there will not be an excess of flow of the seed through two or three adjacent holes where other holes or perforations may not have any or hardly any seed passing therethrough.

Another feature of this invention is to provide a novel structure of hand seed sower that guides the seed to the perforations or holes in the sower and controls the distribution of the seeds so that there is greater uniformity of sowing than heretofore obtained and to accomplish these results with much less effort.

Another feature of this invention is the provision of the improved type of low cost seed holder and spreader with the openings therein provided with desirable baffles, or the like, so that a substantially uniform distribution of the flow of the seed will be obtained without having some of the openings having no seed flowing therethrough while other openings have a somewhat sizeable continuous flow of the seed. The baffles are of a height that acts to keep a level of seed between them.

It is also a further feature of this invention to provide a definite area of the container with the perforations and to deform this area by forming the baffles so they extend inwardly. This perforated area is deformed in other ways as by corrugating the same in usual corrugating fashion, or by forming various designs of channels, mounds, or bulges, or the like, as may be noted in the drawings. It is desired, however, to have a series of corrugations in the various deformed portions of the perforated area.

Another arrangement of the corrugations may be in parallel formations with perforations in the corrugations. This would be the conventional corrugated assembly and allows one area of perforations to be in the corrugations, while another perforated area in the spreader may be flat or have the mounds formed therein.

While the disclosure of this invention will be made in connection with a desired novel seed and/or fertilizer dispensing container, its size may be materially increased or decreased, and this preferred seed sowing dispenser or container is not to be restricted to use with the usually expensive seeds.

Other features and advantages will be noted as described in detail in the following description, and in the drawings, wherein:

FIG. 1 is a perspective view of a seed sowing device showing a bag of seed held therein during transportation and provides one form of an area of perforations in at least one wall of the container or device for properly sowing the seeds;

FIG. 2 is a modified form of the positioning of the perforated area in the seed sowing container;

FIG. 3 is a broken away portion of FIG. 1 taken on the lines 3—3 thereof;

FIG. 4 is a cross sectional view of one wall of the container taken through the perforations thereof and showing various formations in the wall of the container to attain satisfactory and substantially uniform sowing of the seeds;

FIG. 5 is a modifiied form of the wall of the perforated portion or area of the container wherein projections or baffles are shown for assisting in maintaining and guiding the seeds to the perforations, and for maintaining a considerable quantity of seed adjacent any group of perforations;

FIG. 6 is a modified form of corrugations formed in the wall of the container in one of the perforated areas thereof;

FIG. 7 is an enlarged view of a dome formation of the perforated wall of the container and usable instead of corrugations or other forms particularly illustrated in FIGS. 1, 2 and 6;

FIG. 8 is a modified formation of the perforated are as shown in FIGS. 1 and 6;

FIG. 9 is a sectional view of one of the dome formations in the wall of the perforated part of the container;

FIG. 10 is a partial cross section of a seed sowing container wherein the perforated area may be replaced by another perforated area with other size holes therein; and FIG. 11 is a partial cross section of another formation of seed sowing container showing the perforations and grooves in the container as being positioned in a straight line.

Referring now to the drawings, a suitable container 15 is provided as a container or sower or dispenser or spreader of seeds, or fertilizer, or both, or other materials, and is especially provided to include one or more bags of the seed for sales and transportation purposes. This container or box 15 is subject to being sealed after the bag of seed has been inserted. Also, this container 15 is provided with one or more perforated areas in one or more of its surfaces and thus provides a seed sowing container, dispenser, or device, or article, and is convenient to be grasped in the hand and shaken so that the seed may be substantially uniformly distributed. If desired, a handle (not shown) may be attached to one or more of the outer surfaces of the container. Also, if desired, the container may be circular or round in its formation.

In providing such an article for sowing seeds, fertilizer and the like, it may be made of paper of various strengths and thicknesses, or cardboard, or even metal, or plastics, and the like, or combinations of these various materials. Preferably, this container 15 can be somewhat flexible so that the perforations may be readily made and the perforated area deformed in a satisfactory manner to usually keep a layer of seed over the perforations so that there will be a substantially uniform flow of the seed through the various perforations. The means for obtaining these results will be noted in the further description. In using these sowers, or spreaders, or devices, the seed spreading is easily observed and if a heavier spread is desired, the shaking is either increased or the spreading repeated.

In deforming the perforated area, any suitable design may be incorporated, as by forming corrugations or grooves, or channels 16 in the area which has the perforations 17 theerin. The perforations or holes are usually round but may be of other shapes.

With or in addition to the formation of corrugations or channels 16, the perforated area may be deformed to form domes or mounds 18, and such domes usually include a group of the perforations 17 as may be further noted in detail in both FIGS. 7 and 9. FIGS. 6 and 8 illustrate different designs of corrugations, channels, circular areas, or square areas, all of which are created by deforming all or part of the perforated area in the container or box 15. When desired, the corrugations may be formed in straight crossing lines, or diagonal lines, or zig-zig lines, or herring bone formations, or combinations of these lines, or in parallel lines.

When this container with seed therein is to be sold and transported to the purchaser's home, it is preferred to enclose one or more bags of seed/or fertilizer in the container and seal it, thus the unit is ready to be carried or shipped to any point. This unit preferably contains a sheet 19 of any satisfactory material which may be inserted between the container and the paper bags and functions to retain within the container any seeds that may spil out from the bags in case there is any puncture or leakage in the bags. Additional sheets 19 may be enclosed for covering other perforated areas in the container so that there is no leakage from the unit.

When the purchaser is ready to use the container sower or dispenser, the sheet 19 is removed and the bag 20 is removed and slits made in its sides and again replaced in the container, or the seed is poured from the bag 20 into the container and then the dispenser 15 is ready for sowing the seed and any fertilizer that may be mixed with the seed.

In the event the purchaser does not wish to use all of the seed and there is still loose seed in the container the sheet 19 may again be inserted in the container between the seed and the perforated area or between the bag and the perforated area and thus use the spreader another time.

In another form of container especially used for shipping purposes, reference is made to FIG. 2 wherein the container 15 has the perforated area at the top and somewhat down the sides of the container. With the structure there shown, a suitable cover 21 is provided to retain the seed within the container 15 and within the cover 21 when shipping. This cover is usually sealed to the container around the lower edges of the cover, or may be a tight fit and removable as desired. The sealing is usually around the bottom edges below the perforated areas of the container, as shown in FIG. 2. The sheet 19 in other forms can be inserted between the perforated areas and the cover 21 as may be desired, and such sheets are especially incorporated when the cover 21 is only made to have a tight fit over the container 15.

In the most satisfactory operation of this seed sower-container-dispenser, it is desired to maintain a level of seed within a group of the perforations 17 and for accomplishing this end, the deformation of the perforated area is shown in FIG. 5 by providing suitable projections, or obstructions, or barriers, or baffles 22, 23 and 24, as noted. It will be especially seen that all of these barriers or baffles are positioned on the inner surfaces of the perforated area and that they may have definite configurations as especially noted at 23 and 24. From experience it has been found that there is always a quantity of seed maintained or retained between the baffles and over a group of perforations and thus there is practically always a uniform flow of the seeds through the perforations 17. These barriers or baffles assist in another manner in that there is always a certain amount of seed near each group of perforations during the shaking for sowing and so that normally other perforations or groups of perforations also have a quantity of seed near them. While the barriers or baffles 22, 23 and 24 are shown as being on the inner surface of the perforated area, these baffles can be formed in the surfaces of the domes in substantially the same manner as corrugations 16. In FIG. 4 one of the domes 16 is indicated as being formed inwardly as at 25. In the event the projections or baffles are not incorporated, then it is desirable to enlarge the perforations to some extent. Also, without the baffles, it will be noted that there is less uniformity of sowing as some perforations will have many seeds congregated to them while other perforations will have none.

When the domes 18 are formed, they will act in substantially the same way as the barriers in that they will keep a certain amount of seed near the perforations, and the perforations in the domes may be considered as one of the groups of perforations.

Referring now to FIGS. 10 and 11, a special form of spreader or container is shown where the wall 26 of the perforated container 15 is shown as being removable. The side wall 27 of the container 15 is formed to hold the wall 26 in position. This wall 26 is made removable so that a wall of different size perforations may be employed, depending on the type of seed being sown.

The container may have two perforated areas with deformations formed therein, or one perforated area may be deformed in various manners as shown in FIGS. 1, 6 and 8, and another perforated area may be just smooth and not deformed. This second or smooth perforated area may be positioned at other places or sides of the container.

The container or dispenser herein can be used for the dispensing of seeds alone, or with seeds and various kinds of fertilizer so that the sowing may be done in a uniform manner to obtain the greatest advantage and uniformity of sowing and thereby obtain substantially uniform resulting grass or product therefrom. Whenever seed sowing is mentioned herein, it is intended to cover the sowing of the seed alone, or seed with fertilizer, or fertilizer alone, or of other materials easily handled by this improved container.

When the container is used for shipping, as noted in FIG. 3, the bag of seed 20 is preferably held in position in the container by an extra filler 28 which prevents the bag of seeds 20 from moving during transportation.

It will be understood that various modifications and changes may be made in the preferred form of the invention herein, and such modifications and changes are to be understood as part of this invention, as outlined in the following claims.

The invention claimed is:

1. A shipping and dispensing container for grass seed including a bag for enclosing the grass seed, a box in which the bag is held, said box being longer than the bag so as to leave an empty chamber in one end of the box and into which grass seed enters when the bag is broken or removed preparatory to dispensing of the grass seed, at least one wall of the chamber having a plurality of deformations therein spaced from one another and along a substantial length of the wall and wherein the cross-section of the deformation is arcuate, and each of said deformations has a plurality of perforations that open through said wall and that are open and exposed from the outside of the container when in use as a shipping container, the different openings having their longitudinal axes in different angular relation to said wall whereby shaking of the container parallel to the extent of said wall causes the grass seed to be deflected into the deformations toward the openings which have their longitudinal axes at the different angles.

2. A shipping and dispensing container for grass seed, including a bag for enclosing the grass seed, a box into which the bag fits, the box being longer than the bag so that there is an empty space of substantial volume in the box above the grass seed, the box having side walls and end walls, at least one of the end walls being hinged to a side wall and adapted to open and close for repeated access to the interior of the box, one of the side walls having rows of perforations therein of a diameter sufficient to sift grass seed from the box when the bag is removed and the grass seed is spilled loosely in the box, the side wall with the perforations therein having portions of its area distorted to form a plurality of regions of arcuate cross section through which some of the perforations open with the different perforations in different angular relation to the plane of the undistorted wall of the box whereby seeds shifting transversely across the perforated wall, when the box is shaken, are tumbled by the distorted surfaces of the box into the different angularly related perforations to facilitate sifting of the grass seed through the perforations, and a sheet located in the box over the perforations and held in place by pressure of the seed against the inside surface of the sheet, said sheet being removable and replaceable through the end wall of the box when the end wall is hinged into open position and serving as a slide for covering and uncovering the perforations, the sheet being of substantially the same length as the perforated wall so that the end wall of the box prevents movement of the sheet when the end wall is in closed position.

3. A dispensing container for grass seed or the like including walls of sheet material extending in angular relation to one another and at least one of which is perforated and has a plurality of deformations therein forming protuberances on one side of the wall and corresponding depressions on the other side of the wall, the deformations being of arcuate cross section in at least one direction with the arc formed by the material of each deformation limited to at least 180° so that most portions of the depressed surface of the deformation have a component of direction parallel to the direction of extent of the undeformed portions of the wall, at least some of the perforations being in the deformed surfaces of the wall and through the deformations, and at least the major part of each deformation being spaced from the other deformations, and the perforations being in rows that extend across a plurality of the deformations.

4. The dispensing container described in claim 3 and in which the displaced areas in the wall are domes.

5. The dispensing container described in claim 3 and in which some of the displaced areas are corrugations forming channels in the inside surface of the wall, and others of the displaced areas are domes.

6. The dispensing container described in claim 3, and in which different perforations through the deformations are at different locations along the arcs of curvature of the deformations so that the longitudinal axes of different perforations are at different angles.

7. The dispensing container described in claim 3 and in which the inner surface of the perforated wall has barriers formed therein between groups of perforations thereby maintaining a level of seeds between said barriers and available for dispersion by the shaking of said container.

8. The dispensing container described in claim 3 and in which the container is a box having side walls and end walls, at least one of the end walls being hinged to a side wall and adapted to open and close for repeated access to the interior of the box, and a sheet located in the box over the perforations and held in place by pressure of the contents of the box against the inside surface of the sheet, said sheet being removable and replaceable through the end wall of the box when the end wall is hinged into open position and serving as a slide for covering and uncovering the perforations, the sheet being of substantially the same length as the perforated wall so that the end wall of the box prevents movement of the sheet when the end wall is in closed position.

References Cited in the file of this patent

UNITED STATES PATENTS

| | | |
|---|---|---|
| 340,564 | Elliott | Apr. 27, 1886 |
| 358,863 | Lyon | Mar. 8, 1887 |
| 742,271 | Allen | Oct. 27, 1903 |
| 941,992 | Jenkins | Nov. 30, 1909 |
| 1,558,396 | Roehrs | Oct. 20, 1925 |
| 1,729,213 | Ford | Sept. 24, 1929 |
| 2,010,121 | Wesley | Aug. 6, 1935 |
| 2,089,483 | Jaenicke | Aug. 10, 1937 |
| 2,129,980 | Alfred | Sept. 13, 1938 |
| 2,134,367 | Hudiakoff | Oct. 25, 1938 |
| 2,516,471 | Letsch | July 25, 1950 |
| 2,610,432 | Ambrose | Sept. 26, 1952 |
| 2,735,584 | Pullen | Feb. 21, 1956 |

FOREIGN PATENTS

| | | |
|---|---|---|
| 25,755 | Great Britain | 1904 |
| 441,317 | Great Britain | Jan. 16, 1936 |
| 1,065,050 | France | Dec. 30, 1953 |